(12) United States Patent
Wales et al.

(10) Patent No.: US 12,011,687 B2
(45) Date of Patent: Jun. 18, 2024

(54) INTERFACE SEAL ASSEMBLY FOR A TUBULAR FILTER ELEMENT

(71) Applicant: Parker Hannifin Manufacturing (UK) Ltd., Hemel Hempstead (GB)

(72) Inventors: Joseph R. Wales, Tyne and Wear (GB); David T. Robertson, Tyne and Wear (GB); Matthew Pearson, Tyne and Wear (GB)

(73) Assignee: Parker Hannifin Manufacturing (UK) Ltd., Hemel Hempstead (GB)

( * ) Notice: Subject to any disclaimer, the term of this patent is extended or adjusted under 35 U.S.C. 154(b) by 419 days.

(21) Appl. No.: 17/512,725

(22) Filed: Oct. 28, 2021

(65) Prior Publication Data

US 2022/0047986 A1 Feb. 17, 2022

Related U.S. Application Data

(63) Continuation of application No. PCT/EP2020/063540, filed on May 14, 2020.

(30) Foreign Application Priority Data

May 22, 2019 (GB) ..................................... 1907224

(51) Int. Cl.
*B01D 53/04* (2006.01)
(52) U.S. Cl.
CPC ...... *B01D 53/0415* (2013.01); *B01D 2256/22* (2013.01); *B01D 2257/30* (2013.01);
(Continued)
(58) Field of Classification Search
None
See application file for complete search history.

(56) References Cited

U.S. PATENT DOCUMENTS 6,579,455 B1 6/2003 Muzik
6,595,372 B1 7/2003 Minowa
(Continued)

FOREIGN PATENT DOCUMENTS

DE 102013020502 A1 6/2015
JP 2000225305 A 8/2000
(Continued)

OTHER PUBLICATIONS

UK Search Report under Section 17(5) for GB1907224.8 dated Nov. 20, 2019.
(Continued)

*Primary Examiner* — Jason M Greene
(74) *Attorney, Agent, or Firm* — Christopher H. Hunter (57) ABSTRACT

An interface seal assembly for sealing a tubular filter element relative to a first component and a second component of a fluid filtration system. The interface seal assembly comprises an body located between the first and second components, and having: an aperture extending through the body for communicating with an internal cavity of the filter element; a first mounting surface comprising a first seal groove; and a second mounting surface opposite the first mounting surface, comprising a second seal groove. One of the first and second seal grooves has a circular shape, and the other has a non-circular shape. A first seal is located in the first seal groove, for sealing the interface body relative to one of the first and second components. A second seal is located in the second seal groove, for sealing the body relative to the other of the first and second components.

44 Claims, 5 Drawing Sheets

(52) U.S. Cl.
CPC ............... *B01D 2257/7025* (2013.01); *B01D 2257/7027* (2013.01); *B01D 2257/708* (2013.01)

(56) References Cited

U.S. PATENT DOCUMENTS

| | | | |
|---|---|---|---|
| 7,303,673 B1 * | 12/2007 | Glazewski | ............. B01D 27/07 210/450 |
| 2010/0176046 A1 | 7/2010 | Goldman | |
| 2011/0005988 A1 | 1/2011 | Bassett | |
| 2013/0067718 A1 | 3/2013 | Kruckenberg | |
| 2018/0043290 A1 * | 2/2018 | Bautz | ................. B01D 35/0276 |

FOREIGN PATENT DOCUMENTS

| | | | |
|---|---|---|---|
| JP | 2011062658 A | 3/2011 | |
| WO | 2018185707 A1 | 10/2018 | |

OTHER PUBLICATIONS

International Search Report and Written Opinion for PCT application PCT/EP2020/063540 dated Jul. 21, 2020.
International Preliminary Report on Patentability for PCT Application PCT/EP2020/063540 dated Aug. 6, 2021.
Response to Invitation to Submit Amended Claims dated 201-05-11.

* cited by examiner

INTERFACE SEAL ASSEMBLY FOR A TUBULAR FILTER ELEMENT

CROSS REFERENCE TO RELATED APPLICATIONS

This application is a continuation of International Application No. PCT/EP2020/063540, filed May 14, 2020, and which designated the United States; and which claims priority to Great Britain Application No. 1907224.8 filed May 22, 2019, the disclosures of which are incorporated herein by reference.

The present invention relates to an interface seal assembly for sealing a tubular filter element relative to a first component of a fluid filtration system and a second component of the fluid filtration system. The present invention also relates to a tubular filter element assembly comprising the interface seal assembly, a fluid filtration system comprising such a tubular filter element assembly, and a method of positioning a tubular filter element in a fluid filtration system and sealing the tubular filter element relative to first and second components of the fluid system. In particular, but not exclusively, the present invention relates to an interface seal assembly for sealing a tubular filter element relative to first and second components of a fluid filtration system.

Fluid filtration systems are well known and take many different forms. One particular fluid filtration system has a use in the purification of a stream of gas, to remove unwanted contaminants. Such systems have a particular use in the purification of Carbon Dioxide ($CO_2$), which is used in a variety of industries including the beverage industry, where it is used in the manufacture of carbonated beverages. Filters of this type are referred to in the industry as $PCO_2$ filters or 'polishers' and are used to remove contaminants present in the $CO_2$, which has been industrially produced. Such contaminants can include volatile Hydrocarbons such as Methane, aromatic Hydrocarbons, Acetaldehyde and Sulphur.

Known $PCO_2$ systems typically comprise a plurality of filter columns, each column defining a chamber which receives a tubular filter element that is insertable in the column. A fluid manifold assembly is attached to the filter columns and serves for directing a stream of $CO_2$ gas into and out of the columns. The manifold assembly comprises a top manifold, a bottom manifold, a fluid inlet, and a fluid outlet. A flow path is defined which extends from the fluid inlet and through the filter columns to the fluid outlet. Typically, one of the top and bottom manifolds is coupled to the fluid inlet, and defines a series of inlet ports, each port associated with a respective column. The other manifold is coupled to the fluid outlet, and defines a series of outlet ports, each port associated with a respective column. The filter columns communicate with the fluid inlet via the inlet ports defined by one of the manifolds, and with the fluid outlet via the outlet ports defined by the other manifold.

The filter elements each contain a filter bed comprising an adsorbent material in a granular/pelleted form (or provided as a cloth wrap), which adorbs contaminants in the stream of $CO_2$ gas passing through the filter element. Where multiple contaminants are to be adsorbed, the adsorbent bed will comprise multiple layers of dedicated adsorbent materials, each suited to the contaminant in question. The $CO_2$ gas that is supplied into the filter columns flows through the filter elements located in the columns. The stream of gas flowing through the inlet is split so that portions of the gas are directed through each one of the filter elements. The gas entering the filter elements flows through the adsorbent bed, where contaminants are separated from the gas stream, before flowing out of the filter elements and into the fluid outlet.

Over time, the adsorbent material contained in the filter elements becomes saturated with contaminants and requires replacing. This typically involves releasing the top manifold from the filter columns and removing the filter elements from their respective columns. Replacement filter elements can then be located in the columns and the top manifold reconnected. Operating instructions for filtration systems of this type usually require that the filter elements be replaced at the earliest to occur of a specified time interval (e.g., every 6 months), or following a 'quality incident' in which a detected contaminant level in the gas stream exiting the filtration system exceeds a predetermined level.

In prior filtration systems of this type, the manifold that is coupled to the outlet (normally the top manifold) is sealed relative to the filter columns, via a seal carried by the manifold. In addition, seals carried by end caps of the filter elements seal the elements relative to the manifold, so that the gas stream entering the column is directed through the filter element to the manifold.

If incorrect (e.g., wrongly sized) filter elements are located in the columns, then filtration performance may be impaired. In particular, if smaller and/or less efficient filter elements are located in the columns, there may not be sufficient adsorbent material to remove contaminants. In an extreme situation, it may be possible for the system to be operated without any filter elements located in the columns, as the top manifold is sealed directly to the filter columns. It may not be possible to detect either of these situations from a simple visual inspection of an exterior of the filtration system.

One prior filtration system is disclosed in US Patent Publication no. US-2010/0176046A1. The disclosed filtration system comprises a filter basket assembly in which a filter element assembly is placed. The filter element assembly has a filter element affixed to a collar. The collar comprises a body with a continuous annular sidewall disposed around a central axis, and a flange extending radially outwardly from the sidewall. The flange includes first and second faces having ring gaskets disposed thereon around the central axis. The gaskets provide a fluid seal between a body and a cover of the filtration system. The gaskets are both circular shaped O-rings and of similar dimensions. A further ring gasket provides a direct seal between the filter housing and the cover. There is nothing preventing an incorrect filter element assembly being positioned in the filter housing, which may not be correctly sealed relative to the housing and the cover. Also, there is the potential for the system to be operated without a filter element assembly being present, due to the direct seal between the housing and the cover.

According to a first aspect of the present invention, there is provided an interface seal assembly for sealing a tubular filter element relative to a first component of a fluid filtration system and a second component of the fluid filtration system, the interface seal assembly comprising:

a. an interface body which is adapted to be positioned between the first component and the second component of the fluid filtration system, the interface body comprising:
  i. an aperture extending through the interface body, for communicating with an internal cavity of the tubular filter element;
  ii. a first mounting surface comprising a first seal groove; and iii. a second mounting surface opposite the first mounting surface, the second mounting surface comprising a second seal groove;

iv. in which one of the first and second seal grooves has a circular shape, and the other one of the first and second seal grooves has a non-circular shape;

b. a first seal located in the first seal groove, for sealing the interface body relative to one of the first and second components; and c. a second seal located in the second seal groove, for sealing the interface body relative to the other one of the first and second components.

The interface body may be adapted to be mounted on/coupled to an end of the tubular filter element.

The interface body may be a unitary or one-piece body, which may define the aperture, mounting surfaces and seal grooves.

The first and second seals may be axial face seals, adapted to provide an axial seal against surfaces of the respective components. The axial sealing effect may be taken relative to an axis of the interface body, which may extend through the aperture, and which may extend between the first and second mounting surfaces.

One of the first and second components may be a tubular housing comprising an internal chamber which receives the filter element. The tubular housing may contain a filter material, which may be or may comprise an adsorbent material for adsorbing contaminants. The other one of the first and second components may be a manifold, which may form part of a manifold assembly. The manifold may comprise a flow port, which may be arranged to communicate with the internal cavity of the filter element when the interface body is positioned between the tubular housing and the manifold, via the aperture in the interface body. The manifold may communicate with a fluid outlet of the manifold assembly, and the flow port may form an outlet port in fluid communication with the fluid outlet. The non-circular seal may surround the flow port.

The interface seal assembly may effectively serve for sealing the first component of the fluid filtration system relative to the second component of the system. It may not be possible to seal the first component relative to the second component in the absence of the interface seal assembly. As the interface body of the interface seal assembly is mounted on the end of the tubular filter element, this has the advantage that it may not be possible to seal the first component of the fluid filtration system relative to the second component of the system unless the tubular filter element (including the interface seal assembly) is present. This may address problems in prior fluid filtration systems, in which the system can still be operated without a filter element being present. This is because a leak path will exist if the filter element including the interface seal assembly is not present.

The first mounting surface may be adapted to be disposed adjacent to one of the first and second components and may be arranged to abut said component. The second mounting surface may be adapted to be disposed adjacent to the other one of the first and second components and may be arranged to abut said component.

The tubular filter element may define an internal chamber which receives the filter element, and the chamber may be of any suitable cross-section, but will typically be of circular cross-section.

The first mounting surface may face the first component and may be arranged to abut the first component. The first seal may be arranged to seal the interface body relative to the first component. The second mounting surface may face the second component and may be arranged to abut the second component. The second seal may be arranged to seal the interface body relative to the second component. The first seal may have the circular shape. The second seal may have the non-circular shape.

The first mounting surface may be a lower or inner (optionally axially inner) mounting surface. The first mounting surface may face towards the tubular filter element, in use. The first seal groove may be provided in, and/or may open on to, the first mounting surface, and may extend in a direction into the surface. The second mounting surface may be an upper or outer (optionally axially outer) mounting surface. The second mounting surface may face away from the tubular filter element, in use. The second seal groove may be provided in, and/or may open on to, on the second mounting surface, and may extend in a direction into the surface. The first and second seal grooves may face in different directions.

The interface body may be annular/generally ring-shaped. The interface body may extend around a longitudinal/central axis of the body. The interface body may be or may comprise a flange, rim or ring, which may define the mounting surfaces. The flange, rim or ring may be generally planar. The first mounting surface may be in a first plane. The second mounting surface may be in a second plane. The first and second planes may be parallel. The first and second planes may be perpendicular to an axis of the interface body, which axis may be (in use) parallel to a longitudinal axis of the tubular filter element. The first and second planes may be spaced apart in an axial direction, and/or in a direction along the longitudinal axis.

The first and second seals may be generally planar. The first and second seals may each define central axes which may extend around bodies of the seals, and the central axes may each be disposed in a single plane. The first and second seals may extend out of the respective seal grooves away from the mounting surfaces and may extend away from said surfaces to a maximum outer extent. The outer extents of the seals may each be disposed in a single plane.

The circular and non-circular shapes of the seals may be considered in plan view.

The circular seal may have a substantially constant radius of curvature. The non-circular seal may be at least partly curved, and of a non-constant radius of curvature.

The non-circular seal may have a kidney bean shape/profile in plan view.

The non-circular seal may comprise a first lobe, a second lobe, and intermediate portions which connect the first and second lobes (considered in plan view). The lobes may be curved and may each have substantially constant radii of curvature. The intermediate portions may each extend inwardly so that they are displaced from a circle which intersects the curved lobes and may extend radially inwardly.

The non-circular seal may comprise a main generally circular portion describing a diameter of the seal, and a waist portion which is narrowed relative to the main portion. A width of the waist portion may be less than the diameter. The waist portion may be defined by opposed narrowed sections, which may extend inwardly towards a centre of the seal, optionally radially inwardly.

The non-circular seal may comprise a generally circular part, extending along a generally circular path. The non-circular seal may comprise at least one further part, which may be deflected from the circular path, to provide the seal with its non-circular shape. At least one further part may be disposed at least partly within the circular path described by the circular part of the seal. A space or gap may be defined between an outer extent of said further part (which may be a radially outer extent), and the circular path. Said further part may be deflected inwardly from the circular path, optionally radially inwardly. Said further part may be curved and may curve inwardly towards a centre of the seal. Said further part may have a non-constant radius of curvature. The generally circular part may comprise a first curved portion and a second curved portion, each of which extends along the circular path. The seal may comprise first and second such further parts, which may connect the first curved portion to the second curved portion. The first and second curved portions may be separated by the further portions. The curved portions and the further portions may be provided alternately, taken in a direction around a perimeter of the seal.

The non-circular seal may have a shape/profile which matches a shape/profile of the respective seal groove. The non-circular seal may be deformable to conform to a shape/profile of the respective seal groove.

One or both of the seals may have a circular shape in cross-section, taken across a width of a body of the seal (which may be in a plane that is parallel to a line extending from a centre of the seal, and which may be a radius). One or both of the seal grooves may be generally U-shaped in cross-section and may comprise a base and two opposed flanks.

The interface seal assembly may comprise at least one mount, for mounting the assembly to one or both of the first and second components. The interface body may define the at least one mount. The assembly may comprise at least two mounts, which may be spaced apart around a perimeter of the assembly. The assembly may comprise at least three mounts and may comprise up to four mounts. Said mount may comprise an aperture which is shaped to receive a fixing for securing the interface seal assembly to the component or components, the fixing passing through the aperture. The fixing may clamp the mount to the component or between the components.

The interface body may comprise a mounting structure for mounting the body to the tubular filter element. The mounting structure may comprise a groove or channel which is adapted to receive a housing of the tubular filter element. The groove/channel may be provided on or in one of the first and second mounting surfaces. The mounting structure may comprise a protrusion, which may be mounted on or provided by the interface member, and which defines the groove/channel. The protrusion may be an annular lip or ring extending around the interface body. The housing may be tubular and may be a filter column of the filter element. The mounting structure may be adapted to receive a wall of the housing, suitably a part of the wall defining an edge surface at an end of the housing. The groove/channel may taper. The groove/channel may have a width, taken in a radial direction, which reduces in a direction from an outer opening towards a base of the groove/channel.

The interface seal assembly may comprise a handle which extends from the interface body. The handle may facilitate handling of the tubular filter element. The handle may project from the interface body in a direction which is away from the second mounting surface. The handle may project from the interface body in a direction which is, in use, away from the filter element.

The aperture of the interface body may be generally centrally located. The aperture may be centrally located relative to an axis of the interface body, which axis may be perpendicular to a plane of the body. The aperture may have a non-circular shape. A shape or profile of the aperture may be similar to a shape/profile of the non-circular seal (for example generally kidney bean shaped).

The circular seal may describe a maximum outer diameter. The circular seal may describe a minimum inner diameter. The non-circular seal may describe a maximum outer dimension, which may be no greater than said outer diameter, and which may be less than said outer diameter. The outer dimension may be no greater than said inner diameter and may be less than said inner diameter. At least part of the non-circular seal may be disposed inwardly of the circular seal (optionally radially inwardly), relative to the interface body. Said part of the non-circular seal may describe a minimum outer dimension of the non-circular seal, which is less than said minimum inner diameter of the circular seal. The intermediate portions/narrowed sections/further parts of the non-circular seal may be disposed radially inwardly of the circular seal.

According to a second aspect of the present invention, there is provided a tubular filter element assembly comprising a tubular filter element and an interface seal assembly for sealing the tubular filter element relative to a first component of a fluid filtration system and a second component of the fluid filtration system, the interface seal assembly comprising:

d. an interface body adapted to be positioned between the first component and the second component of the fluid filtration system and comprising:
      i. an aperture extending through the interface body, for communicating with an internal cavity of the tubular filter element;
      ii. a first mounting surface comprising a first seal groove; and
      iii. a second mounting surface opposite the first mounting surface, the second mounting surface comprising a second seal groove;
      iv. in which one of the first and second seal grooves has a circular shape, and the other one of the first and second seal grooves has a non-circular shape;
   e. a first seal located in the first seal groove, for sealing the interface body relative to one of the first and second components; and
   f. a second seal located in the second seal groove, for sealing the interface body relative to the other one of the first and second components.

The interface body may be adapted to be mounted on/coupled to an end of the tubular filter element. The interface seal assembly may form an end cap of the filter element. The interface seal assembly, in particular the interface body, may be secured to a tubular housing of the filter element, and may be bonded to the housing.

Further features of the interface seal assembly forming part of the tubular filter element, and/or of the tubular filter element, may be derived from the text set out elsewhere in this document, particularly in or with reference to the first aspect of the invention.

According to a third aspect of the present invention, there is provided a fluid filtration system comprising:
   g. a first component;
   h. a second component; and
   i. a tubular filter element assembly comprising a tubular filter element and an interface seal assembly for sealing the tubular filter element relative to the first component and the second component, the interface seal assembly comprising:

j. an interface body adapted to be positioned between the first component and the second component of the fluid filtration system and comprising:
   i. an aperture extending through the interface body, for communicating with an internal cavity of the tubular filter element;
   ii. a first mounting surface comprising a first seal groove; and
   iii. a second mounting surface opposite the first mounting surface, the second mounting surface comprising a second seal groove;
   iv. in which one of the first and second seal grooves has a circular shape, and the other one of the first and second seal grooves has a non-circular shape;
k. a first seal located in the first seal groove, for sealing the interface body relative to one of the first and second components; and
l. a second seal located in the second seal groove, for sealing the interface body relative to the other one of the first and second components.

The interface body may be adapted to be mounted on/coupled to an end of the tubular filter element.

Further features of the interface seal assembly, and/or of the tubular filter element assembly, may be derived from the text set out elsewhere in this document, particularly in or with reference to the first and second aspects of the invention.

One of the first and second components may be a tubular housing comprising an internal chamber which receives the tubular filter element. The other one of the first and second components may be a part of a manifold assembly and may be a manifold. The manifold may comprise a flow port, which may be arranged to communicate with the internal cavity of the filter element when the interface body is positioned between the tubular housing and the manifold, via the aperture in the interface body. The non-circular seal may surround the flow port. The manifold may communicate with a fluid outlet of the manifold assembly, and the flow port may form an outlet port in fluid communication with the fluid outlet.

The interface body may be visible from an exterior of the fluid filtration system following positioning of the body between the first and second components. In the context of a fluid filtration system, this may provide a visual indication that the tubular filter element (on which the interface body is mounted) is correctly positioned between the tubular housing and the manifold.

The first component may comprise a mounting surface which faces towards the interface body, when the interface body is positioned between the components. The first mounting surface of the interface body may be disposed adjacent to, and may abut, the mounting surface of the first component. The first seal may seal the interface body relative to the mounting surface of the first component. The first component may be the tubular housing of the fluid filtration system. The first seal may be the circular seal.

The second component may comprise a mounting surface which faces towards the interface body, when the interface body is positioned between the components. The second mounting surface of the interface body may be disposed adjacent to, and may abut, the mounting surface of the second component. The second seal may seal the interface body relative to the mounting surface of the second component. The second component may be the manifold of the fluid filtration system. The second seal may be the non-circular seal.

One of the first and second components may comprise at least one bypass passage. In the event that an attempt is made to position an incorrect tubular filter element between the first and second components (having an incorrect or no interface seal assembly), the bypass passage may serve for bypassing a seal on the incorrect filter element/interface seal assembly, so as to prevent sealing abutment with said component. In particular, where an incorrect tubular filter element which does not have a non-circular seal is positioned between the components (or an interface seal assembly which does not have a non-circular seal), the bypass passage may bypass the seal. This may prevent the fluid filtration system functioning with the incorrect filter element.

The or each bypass passage may be formed in the mounting surface of the component which faces towards the interface body. The or each bypass passage may extend outwardly, optionally in a generally radial direction, relative to the tubular filter element. The or each bypass passage may be disposed, in use, outside of a perimeter of the non-circular seal. This may ensure sealing where the correct tubular filter element, having the interface seal assembly with the non-circular seal, is positioned between the first and second components. The or each bypass passage may be provided in the manifold.

Where the non-circular seal comprises a first lobe, a second lobe, and intermediate portions which connect the first and second lobes, the bypass passage(s) may be disposed adjacent an intermediate portion, or each intermediate portion, and outside of the perimeter of the seal.

Where the non-circular seal comprises a main generally circular portion describing a diameter of the seal, and a waist portion which is narrowed relative to the main portion, a width of the waist portion being less than the diameter, the bypass passage(s) may be disposed adjacent the waist portion, and outside of the perimeter of the seal.

Where the non-circular seal comprises a generally circular part extending along a generally circular path, and at least one further part disposed at least partly within the circular path, the bypass passage(s) may be disposed within the circular path adjacent the further part or each further part, and outside of the perimeter of the seal. Where a space or gap is defined between an outer extent of said further part and the circular path, the bypass passage(s) may be disposed in said space or gap.

At least one bypass passage may be provided which is disposed within a perimeter defined by the non-circular seal. Where an incorrect tubular filter element which does not have a non-circular seal is positioned between the components (or an interface seal assembly which does not have a non-circular seal), the or each such bypass passage may bypass the seal. This may prevent the fluid filtration system functioning with an incorrect filter element having a small circular or other shape seal and which is sized to avoid the bypass passage disposed outside of the perimeter of the seal.

The or each bypass passage may be a blind bore or channel formed in the one of the first and second components, or an aperture extending through said component.

The first component mounting surface may extend around a perimeter of the component. The first component mounting surface may face towards the second component mounting surface in use, when the interface body is positioned between the components. The second component mounting surface may be arranged so that it overlaps the first component mounting surface. However, the system may function without such an overlap between the first and second component mounting surfaces. The second component mounting surface may be arranged so that it only partially overlaps the first component mounting surface, at least at one point around the perimeter of the first component. An extent of the overlap at said point may be insufficient to provide or mount a seal between the first and second components in the absence of the interface seal assembly. In particular, there may be insufficient material in the overlapping portions of the first and second component mounting surfaces to provide or mount a seal between the components. This may prevent sealing of the first and second components directly to one-another in the absence of the interface seal assembly, and so operation of the fluid filtration system without a tubular filter element carrying the interface seal assembly. The first component may be tubular having a wall thickness, and a ratio of the overlap at said point relative to the wall thickness may be in the range of about 1:3 to about 1:5, optionally about 1:3 to about 1:4.

According to a fourth aspect of the present invention, there is provided a method of positioning a tubular filter element in a fluid filtration system and sealing the tubular filter element relative to first and second components of the fluid filtration system, the method comprising the steps of:

m. providing an interface seal assembly according to the first aspect of the invention;

n. positioning the interface body of the interface seal assembly between the first component and the second component of the fluid filtration system with the aperture of the interface body in communication with the internal cavity of the tubular filter element; and o. securing the first component relative to the second component so that the interface body is clamped between the components, the first component being sealed relative to the interface body via one of the first and second seals, and the second component being sealed relative to the interface body via the other one of the first and second seals.

The step of providing the interface seal assembly may comprise mounting or coupling the interface seal assembly, in particular the interface body, on or to an end of the tubular filter element.

One of the first and second components may be a tubular housing comprising an internal chamber, and the method may comprise positioning the tubular filter element within the internal chamber. The other one of the first and second components may be a part of a manifold assembly and may be manifold. The method may comprise bringing the interface seal assembly into sealing abutment with the tubular housing and the manifold, so as to seal the tubular housing relative to the manifold.

Further features of the method of the fourth aspect of the present invention may be derived from the text set out elsewhere in this document, particularly in or with reference to any one of the first to third aspects of the invention.

Embodiments of the present invention will now be described, by way of example only, with reference to the accompanying drawings, in which.

Figure 1:
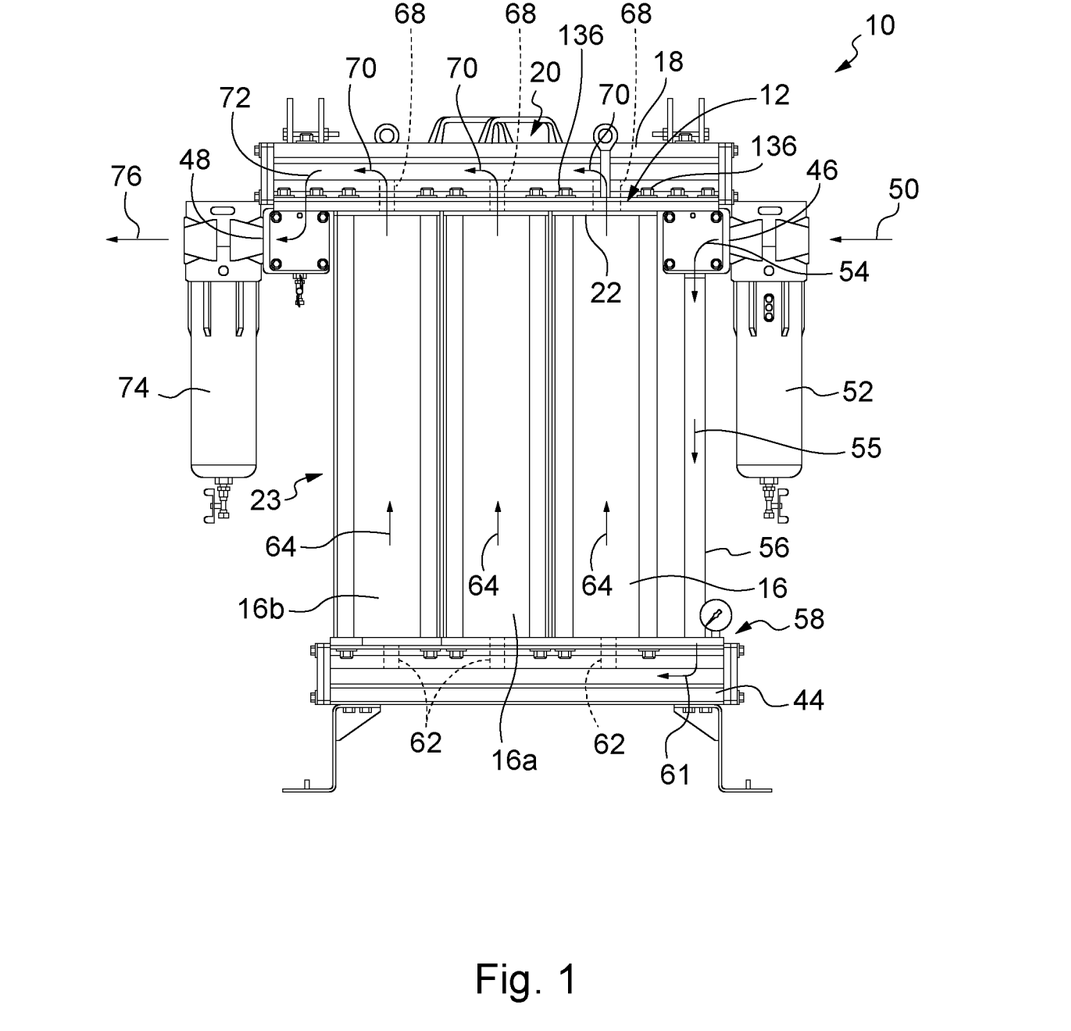
FIG. 1 is a front view of a fluid filtration system, comprising an interface seal assembly, in accordance with an embodiment of the present invention.

Turning firstly to FIG. 1, there is shown a front view of a fluid filtration system comprising an interface seal assembly, in accordance with an embodiment of the present invention. The fluid filtration system is also shown in the perspective view of FIG. 2, where a component of the system has been removed for illustration purposes. The filtration system is indicated generally by reference numeral 10, and the interface seal assembly by numeral 12.

The interface seal assembly 12 is for sealing a tubular filter element 14 relative to a first component 16 and a second component 18 of the filtration system 10. The first component 16 takes the form of a tubular housing known as a filter column, and the second component 18 takes the form of a top manifold of a manifold assembly, the manifold assembly indicated generally by reference numeral 20. The filter element 14 is located within the filter column 16, and the top manifold 18 is secured to the filter column through the interface seal assembly 12, to clamp the interface seal assembly between the top manifold and the filter column. The top manifold 18 has been removed in the perspective view of FIG. 2. The manifold assembly 20 serves for directing a fluid stream into the column 16 and through the filter element 14, where it is filtered.

Figure 3:
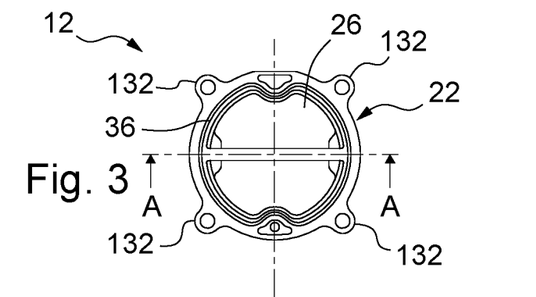
FIG. 3 is a plan view of a tubular filter element carrying the interface seal assembly.
Figure 4:
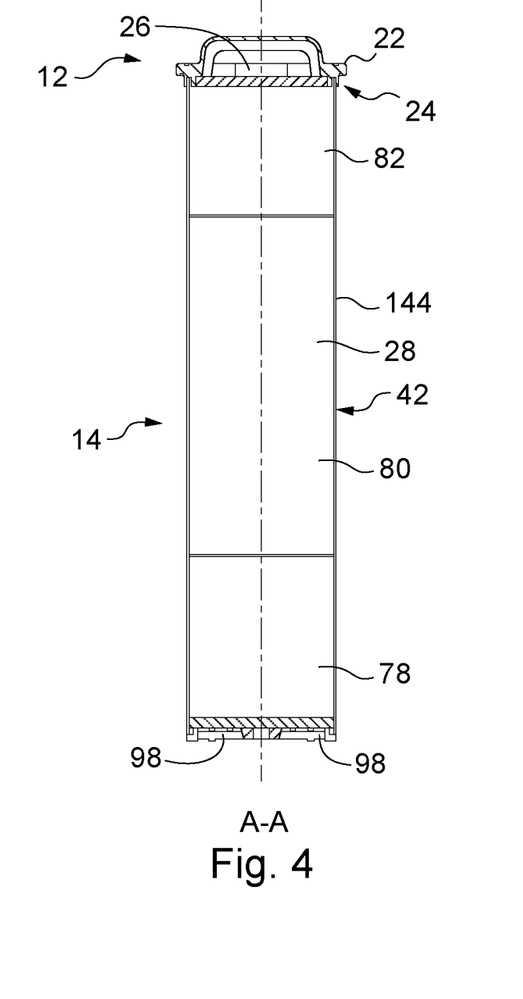
FIG. 4 is a longitudinal sectional view of the tubular filter and interface seal assembly, sectioned along the line A-A in FIG. 3.
Figure 5:
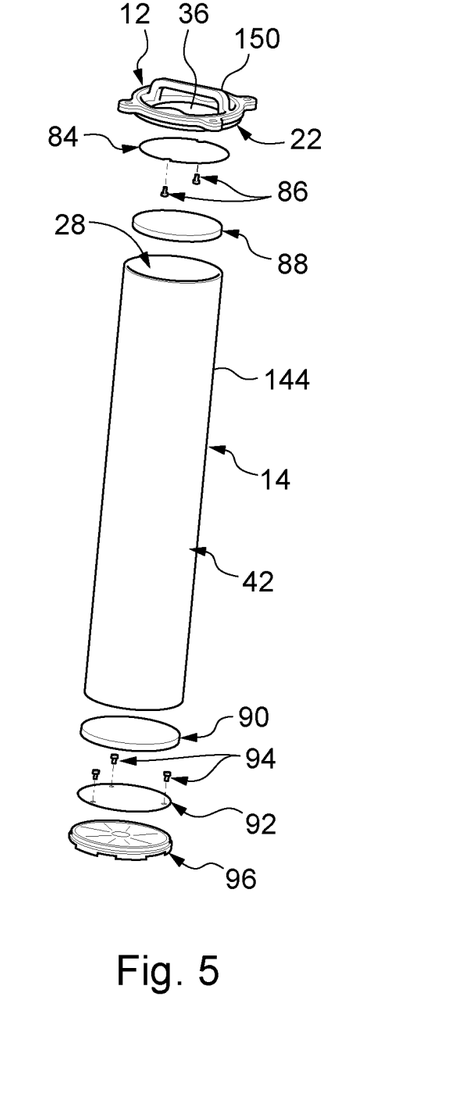
FIG. 5 is an exploded perspective view of the tubular filter and interface seal assembly shown in FIG. 3.

The tubular filter element 14 and the interface seal assembly 12 are shown in more detail in the plan view of FIG. 3, the longitudinal sectional view of FIG. 4 (sectioned along line A-A in FIG. 3), and the exploded perspective view of FIG. 5. Part of the interface seal assembly 12 is also shown separately in the top, side and bottom views of FIGS. 6 to 8, and the perspective view of FIG. 9 (which are drawn to a larger scale).

The interface seal assembly 12 comprises an interface body 22 which is mounted on an end 24 of the filter element 14. In use, the interface body 22 is positioned between the tubular filter column 16 and the top manifold 18 of the fluid filtration system 10. As will be described below, the interface body provides a seal between the top manifold 18 and the tubular filter column 16.

Figures 9, 10, 11, 13:
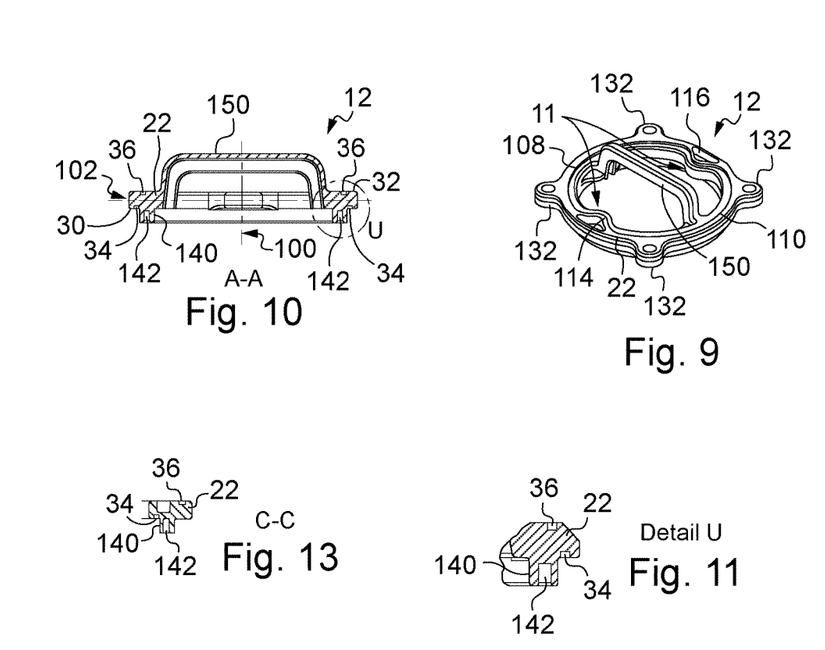
FIG. 10 is a cross-sectional view of the interface body, taken along the line A1-A1 of FIG. 6.
FIG. 11 is an enlarged detail view of part of the interface body shown at U in FIG. 10.
FIG. 13 is a cross-sectional view of the interface body taken along the line C-C of FIG. 6.
Figure 12:
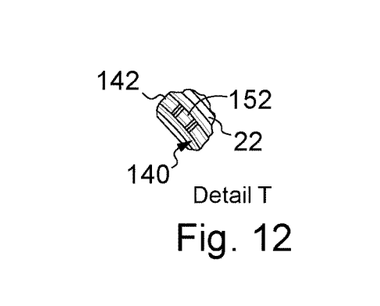
FIG. 12 is an enlarged detail view of part of the interface body shown at T in FIG. 8.
Figure 14:
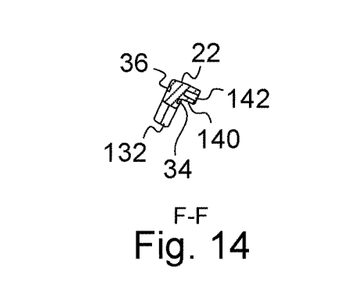
FIG. 14 is a cross-sectional view of the interface body taken along the line F-F of FIG. 6.
Figures 15, 16, 17, 19:
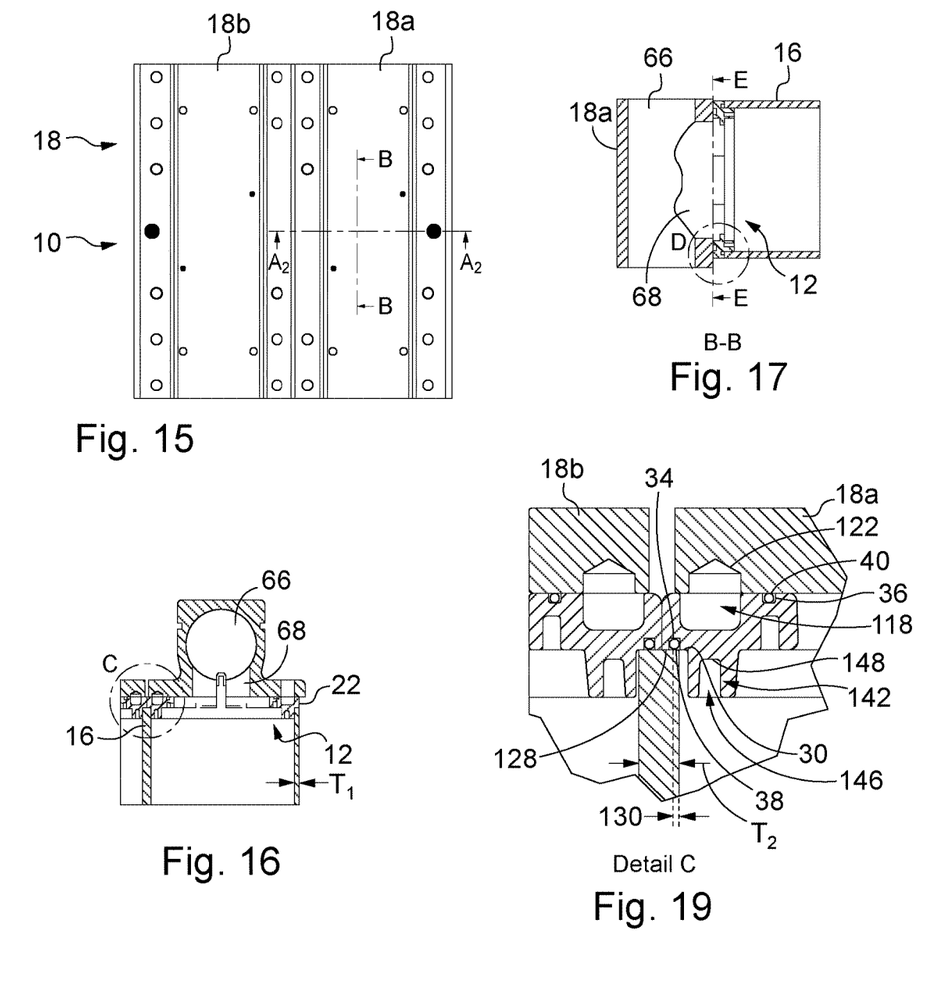
FIG. 15 is a plan view of part of the filtration system.
FIGS. 16 and 17 are cross-sectional views of the fluid filtration system, taken about the lines A2-A2 and B-B of FIG. 15, respectively and shown without the filter element.
FIG. 19 is an enlarged detail view of part of the fluid filtration system indicated at C in FIG. 16.
Figure 18:
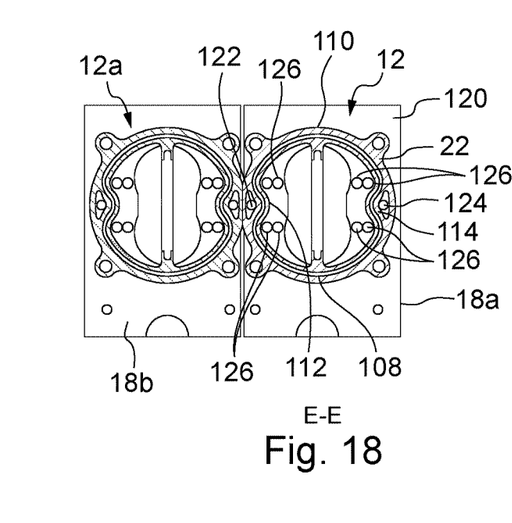
FIG. 18 is a view of the fluid filtration system taken about along the line E-E of FIG. 17.
Figure 20:
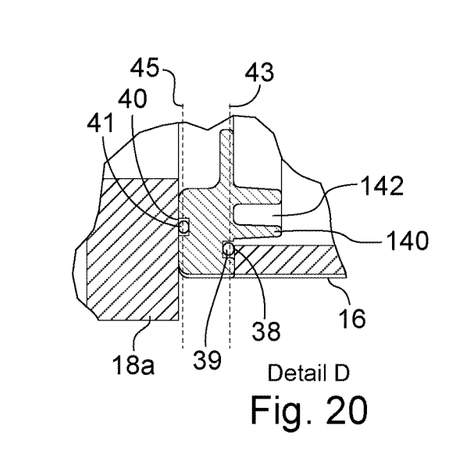
FIG. 20 is an enlarged detail view of part of the fluid filtration system indicated at D in FIG. 17.

FIGS. 10 to 20 will also be referred to. FIG. 10 is a cross-sectional view of the interface body 22 taken along line A1-A1 of FIG. 6. FIG. 11 is an enlarged detail view of part of the interface body 22 shown at U in FIG. 10. FIG. 12 is an enlarged detail view of part of the interface body 22 shown at T in FIG. 8. FIG. 13 is a cross-sectional view of the interface body 22 taken along the line C-C of FIG. 6. FIG. 14 is a cross-sectional view of the interface body 22 taken along the line F-F of FIG. 6. FIG. 15 is a plan view of the filtration system 10. FIGS. 16 and 17 are cross-sectional views of the system 10, taken along the lines A2-A2 and B-B of FIG. 15, respectively and without the filter element 14. FIG. 18 is a view of the system 10 taken along the line E-E of FIG. 17. FIG. 19 is an enlarged detail view of part of the system 10 indicated at C in FIG. 16. FIG. 20 is an enlarged detailed view of part of the system 10 indicated at D in FIG. 17.

The interface body 22 comprises an aperture 26 extending through the body, which communicates with an internal cavity 28 of the filter element 14. The interface body 22 also comprises a first mounting surface 30, and a second mounting surface 32 which is opposite the first mounting surface. The first mounting surface 30 comprises a first seal groove 34, and the second mounting surface 32 comprises a second seal groove 36. As can best be seen by a comparison of the top and bottom views of FIGS. 6 and 8, the first seal groove 34 has a circular shape, whilst the second seal groove 36 has a non-circular shape. As can be seen from the drawings, the interface body 22 is suitably a unitary or one-piece body, defining the aperture 26, first and second mounting surfaces 30 and 32, and the first and second seal grooves 34 and 36.

A first seal 38 is located in the first seal groove 34, and a second seal 40 is located in the second seal groove 36. This is best shown in FIGS. 19 and 20. In use, the first mounting surface 30 of the interface body 22 abuts the tubular filter column 16, and the first seal 38 provides a seal between the interface body and the column. In a similar fashion, the second mounting surface 32 of the interface body 22 abuts the top manifold 18, and the second seal 40 provides a seal between the interface body and the top manifold. The interface seal assembly 12 therefore serves to provide a seal between the tubular filter column 16 and the top manifold 18, when the filter element 14 carrying the interface seal assembly 12 is located in the filter column and secured between the top manifold and the filter column. The first and second seals 38 and 40 are axial face seals, providing an axial seal against surfaces of the respective first and second components (the filter column 16 and the top manifold 18). The axial sealing effect that is provided is taken relative to an axis 100 of the interface body 22, which extends through the aperture 26, and which extends between the first and second mounting surfaces 30 and 32.

The first and second seals 38 and 40 are each generally planar, defining respective central axes 39 and 41 (FIG. 20) which extend around bodies of the seals, and which are disposed in respective planes 43 and 45. The seals 38 and 40 have a circular shape in cross-section, taken across a width of a body of the seal. The seal grooves 34 and 36 which receive the seals are generally U-shaped in cross-section.

As the interface seal assembly 12 is mounted on the end 24 of the tubular filter element 14, it is not possible to seal the filter column 16 relative to the top manifold 18 in the absence of the tubular filter element (carrying the interface seal assembly). In other words, the tubular filter column 16 cannot be sealed relative to the top manifold 18 unless the tubular filter element 14 is present. This addresses problems in prior fluid filtration systems in which they can still be operated without a filter element being present, because a leak path will exist between the tubular filter column 16 and the top manifold 18 (in the absence of the interface seal assembly 12 carried by the tubular filter element 14), which will prevent operation of the system 10.

The interface body 22 effectively provides an end cap of the tubular filter element 14 and is secured to a tubular housing 42 of the filter element, suitably by bonding the body to the housing using an adhesive. In this way, the interface seal assembly 12 can only be positioned between the tubular filter column 16 and the top manifold 18 in conjunction with the filter element 14. The interface body 22 is visible from an exterior of the fluid filtration system 10 following positioning of the body between the filter column 16 and the top manifold 18, as shown in FIG. 1. This provides a visual indication that the filter element 14 (on which the interface body 22 is mounted) is correctly positioned between the filter column 16 and the top manifold 18.

The filtration system 10 shown in the drawings has a use in the purification of a stream of gas, to remove unwanted contaminants. The system may have a particular use in the purification of $CO_2$, such as in the beverage industry where it is used in the manufacture of carbonated beverages. Filters of this type are referred to as $PCO_2$ filters or polishers and are used to remove contaminants in the $CO_2$ including (but not limited to) volatile Hydrocarbons such as Methane, aromatic Hydrocarbons, Acetaldehyde and Sulphur. It will be understood however that the filtration system 10 and interface seal assembly 12 are not restricted to such a use and can be used with other fluids including liquids and in other filtration systems.

The filtration system 10 shown in the drawings comprises six tubular filter columns 16, each of which houses a respective tubular filter element 14. The further filter columns are indicated by numeral 16, with the addition of the suffixes 'a' to 'e' as appropriate, and the further filter elements 14 in a similar manner. Typically, the filter columns 16 are defined by a single housing 23, which forms each of the columns. The filter elements 14a to 14e are each of similar construction and operation to the filter element 14 and carry respective interface seal assemblies 12a to 12e. The filter columns 16a to 16e are of similar construction and operation to the filter column 16. The description of the filter element 14, filter column 16 and interface seal assembly 12 therefore applies to each of the elements, columns and seal assemblies.

The columns 16 to 16e are arranged in two banks or arrays of columns, each comprising three columns. Whilst the columns 16 to 16e are typically provided by the housing 23 (which may be of a metal/metal alloy and cast or otherwise formed), it will be understood that they may be provided separately. It will also be understood that the filtration system 10 is not limited to requiring six columns 16 and corresponding filter elements 14, nor to requiring that the filter columns be arranged in banks.

The manifold assembly 20 serves for directing gas which is to be filtered through each of the tubular filter elements 14 to 14e disposed in the filter columns 16 to 16e. The manifold assembly 20 comprises the top manifold 18, a bottom manifold 44, a fluid inlet 46 and a fluid outlet 48. A flow path is defined which extends from the fluid inlet 46 and through each of the filter columns 16 to 16e, before passing to the outlet 48.

Figure 2:
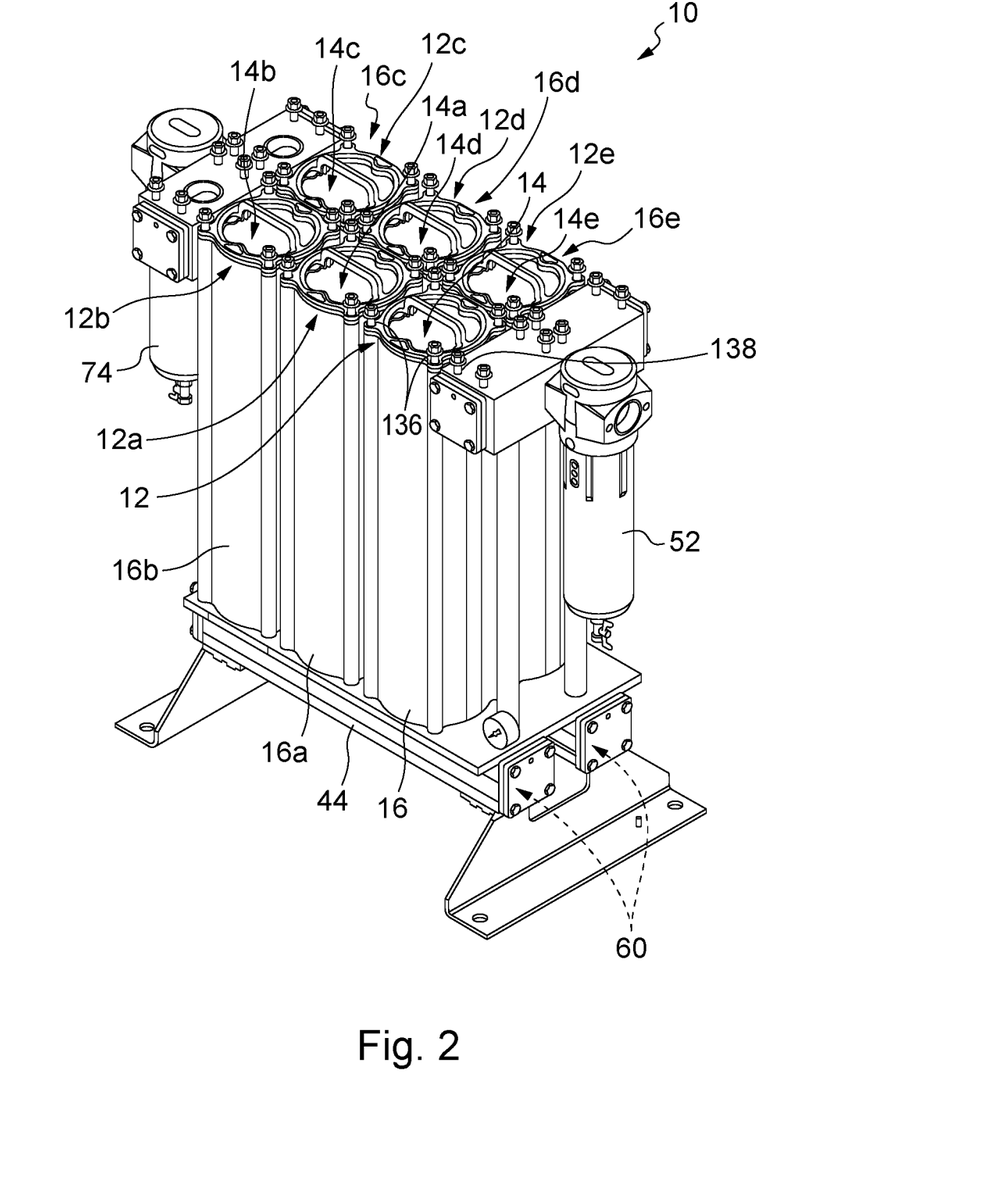
FIG. 2 is a perspective view of the fluid filtration system shown in FIG. 1, with a component of the system removed, for illustration purposes.

Gas enters the filtration system 10 in the direction of the arrow 50 (FIG. 1), passing through an optional pre-filter 52. The gas stream passes in the direction of the arrow 54 into a manifold inlet conduit 56, flowing through the conduit in the direction of the arrow 55 to a manifold junction, indicated at 58 in FIG. 1. The gas then passes on into a main conduit 60 of the bottom manifold 44, as indicated by the arrow 61, two such conduits being provided (one for each bank of columns 16) as shown in FIG. 2.

A series of inlet ports, indicated in broken outline at 62 in FIG. 1, provide fluid communication between the main conduits 60 and respective ones of the filter columns 16 to 16e. The bottom manifold 44 is sealed relative to the columns 16, so that the gas stream passes upwardly through the filter columns 16 to 16e, as indicated by the arrows 64, flowing through the tubular filter elements 14 to 14e positioned within the columns. The gas stream exiting the filter elements 14 to 14e passes into main conduits of the top manifold 18 (one shown in FIG. 16 and given the numeral 66) via outlet ports 68, indicated in broken outline in FIG. 1, the gas flowing in the direction of the arrows 70. The gas stream then flows out of the top manifold 18, as indicated by the arrow 72, before flowing through an optional post-filter 74 and exiting the filtration system through the fluid outlet 48, as shown by the arrow 76.

The internal cavities 28 of each tubular filter element 14 contain a filter bed, typically comprising an adsorbent material in a granular or pelleted form, which adsorbs contaminants in the stream of $CO_2$ gas passing through the filter elements. The adsorbent bed will typically comprise different layers of dedicated adsorbent materials, three such layers being shown and indicated at 78, 80 and 82 in the drawing. It will be understood that these layers will contain materials which are suited to the particular fluid (gas) stream and the contaminants which are to be removed. Equally, fewer or greater layers may be provided.

In addition to the interface seal assembly 12, which as discussed above forms an end cap of the filter element 14, the element includes a top micromesh 84, top and bottom cartridge pads 88 and 90, a bottom micromesh 92 and a bottom end cap 96. The top micromesh 84 is secured to the interface body 22 with screws 86, and the bottom micromesh 92 is secured to the bottom end cap with screws 94.

The bottom end cap 96 includes a number of apertures 98. The gas stream passes from the bottom manifold 44 and into the internal cavities 28 of the filter elements 14 through the apertures 98. The gas stream flows through the various adsorption layers 78, 80 and 82 of each filter element 14, before exiting the cavities 28 through the apertures 26 in the interface bodies 22 and flowing out of the filter element 14 into the top manifold 18.

Figures 7, 8:
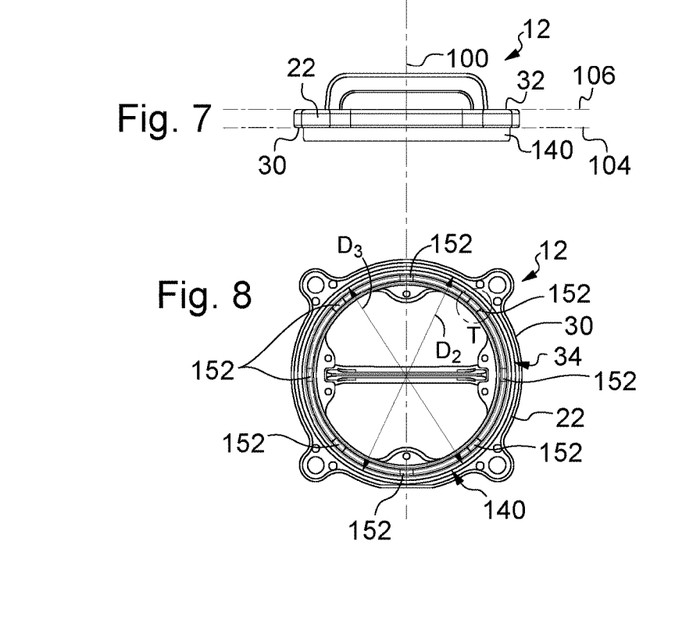

As best shown in FIG. 9, the interface body 22 is annular or generally ring-shaped, extending around a central axis 100 of the body (FIG. 10). The interface body 22 comprises a flange 102 which defines the first and second mounting surfaces 30 and 32. The first seal groove 34 is provided in the first mounting face 30, which effectively forms a lower or inner mounting surface of the interface body 22. The second seal groove 36 is provided in the second mounting surface 32 and faces in a different direction to the first seal groove 34. The flange 102 forms a rim or ring and is generally planar, the first mounting surface 30 being in a first plane 104, and the second mounting surface 32 in a second plane 106 (FIG. 7). The first and second planes 104 and 106 are each disposed perpendicular to the axis 100 of the interface body 22.

Figure 6:
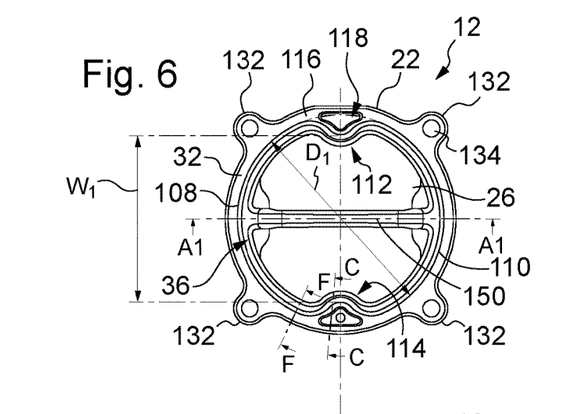
FIGS. 6 to 9 are top, side, bottom and perspective views of an interface body of the interface seal assembly, drawn to a larger scale.

As can best be appreciated from FIGS. 6, 9 and 18, the non-circular seal 40 which is located in the second seal groove 36 conforms to the shape of the seal groove, and so has the non-circular shape. The seal 40 is generally kidney-bean shaped, considered in plan view, comprising a first lobe 108, a second lobe 110, and intermediate portions 112 and 114 which connect the first and second lobes. The lobes 108 and 110 are each curved, and together form a main generally circular portion of the seal, and/or generally circular parts extending along a generally circular path and having a constant radius of curvature. The intermediate portions 112 and 114 extend radially inwardly, so that they are displaced from a circle 116 (indicated in broken outline in FIG. 6) which intersects the curved lobes 108 and 110 and forms the circular path. The seal 40 comprises a waist portion 111, which is narrowed relative to the main generally circular portion, and defined by the intermediate portions 108 and 110, the intermediate portions forming narrowed sections of the waist portion. A width $W_1$ of the waist portion 111 is less than a diameter D1 described by the circular portion/path 116. Spaces or gaps 118 are defined between outer extents of the intermediate portions 112, 114 and the circular path 116. The inward deflection of the intermediate portions 112 and 114 are such that they have a curved shape, with a non-constant radius of curvature, extending between the lobes 108 and 110.

Whilst the non-circular seal 40 shown in the drawings effectively has first and second curved portions, in the form of the lobes 108 and 110 (each of which extends along the circular path 116), and first and second intermediate portions 112 and 114, it will be understood that other configurations may be employed. For example, the non-circular seal 40 may comprise a main part which extends around the circular path 116, with one inward deflection, which may have a similar shape to the intermediate portion 112. Equally, the non-circular seal 40 may comprise more than two curved portions and more than two intermediate portions, each of which couples a pair of adjacent curved portions. For example, three or four inwardly extending portions like the intermediate portion 112 may be provided, spaced apart around a perimeter of the seal 40.

In the situation in which an incorrect filter element is located within the filter column 16, which does not include the non-circular seal 40, then sealing contact with the top manifold 18 is prevented. This is achieved by virtue of bypass passages provided in the top manifold 18, as will now be described.

FIG. 15 is a top view of a part of the top manifold 18 which covers the filter columns 16 and 16a. as can be seen here, the top manifold 18 comprises two separate parts 18a and 18b, each of which covers one of the banks of filter columns 16. FIG. 18 shows a portion of a bottom surface 120 of the top manifold 18, illustrating interface seal assemblies 12 and 12a, coupled to the filter elements 14 and 14a in the columns 16 and 16a. The manifold bottom surface 120 includes a pair of bypass passages 122 and 124. When the correct filter element 14 (carrying the correct interface seal assembly 12) is located in the filter column 16, the bypass passages 122 and 124 are located outside a perimeter of the non-circular seal 40. The bypass passages 122 and 124 are therefore isolated, which ensures correct sealing and so operation of the filter element 14 during use. The interface body 22 is therefore sealed relative to the filter column 16 and the top manifold 18, so that the gas stream passing up through the internal cavity 28 of the filter element 14 flows through the aperture 26 in the interface body 22, outlet port 68, and into the main conduit 66 of the top manifold 18. The non-circular seal 40 therefore acts to prevent gas migration along an interface between the second mounting surface 32 of the interface body 22, and the bottom surface 120 of the top manifold 18.

In the situation in which an incorrect tubular filter element is located in the filter column 16, for example having a standard circular O-ring matching the diameter described by the circular path 116, then the bypass passages 122 and 124 would bridge across the seal. A leak path would therefore be defined between the filter element 14 and the top manifold 18, along the interface between the second mounting surface 32 and the bottom surface 120. This prevents operation of the filtration system 10 with the incorrect filter element.

The bypass passages 122 and 124 are provided as blind bores in the bottom surface 120 of the top manifold 18 and extend radially outwardly to an extent which is sufficient to prevent incorrect fitting of a filter element (of a size suited to the filter column 16). The bypass passages 122 and 124 are effectively provided in the spaces 118 which are defined between the circular path 116 and the intermediate portions 112 and 114. The bypass passages 122 and 124 are suitably disposed adjacent the respective intermediate portions 112 and 114, and outside the perimeter of the non-circular seal 40. This is true whether the seal is considered to be defined in terms of a main generally circular portion and a waist portion, or a generally circular part and a further part disposed at least partly within the circular path.

Typically, the number of bypass passages 122 and 124 which are provided will be matched to the shape of the non-circular seal 40. In the illustrated embodiment, a bypass passage 122, 124 is provided for each of the intermediate portions 112 and 114. Where less than two, or more than two such intermediate portions are provided, there may be a corresponding number of bypass passages.

Further bypass passages are provided in the bottom surface 120 of the top manifold 18, disposed within a perimeter defined by the non-circular seal 40. Eight such further bypass passages 126 are provided, again in the form of blind bores. However, any suitable number and configuration may be employed. Where an incorrect filter element which does not have a non-circular seal of the appropriate shape is positioned in the filter column 16, a seal (e.g., a circular O-ring) carried by the incorrect filter element may be prevented from sealing relative to the bottom surface 120 of the top manifold 18 by one or more of the bypass passages 126.

The filter column 16 comprises a mounting surface 128 which faces towards the interface body 22, when the interface body is positioned between the column and the top manifold 18, as shown in FIG. 19. The first mounting surface 30 of the interface body 22 abuts the column mounting surface 128, and the circular seal 38 seals the interface body relative to the column mounting surface. The bottom surface 120 of the top manifold 18 also defines a mounting surface, which faces towards the interface body 22 when it is positioned between the column 16 and the top manifold. The second mounting surface 32 of the interface body 22 abuts the bottom (mounting) surface 120 of the top manifold 18, and the non-circular seal 40 seals the interface body relative to the manifold surface.

The mounting surface 128 of the filter column 16 extends around a perimeter of the column and faces generally towards the bottom (mounting) surface 120 of the top manifold 18. The mounting surface 120 of the top manifold 18 is arranged so that it only partially overlaps the first component mounting surface (in a radial direction), at points around the perimeter of the column 16. These points are in the vicinity of the intermediate portions 112 and 114 of the non-circular seal 40, as best shown in FIGS. 18 and 19. An extent of the overlap at these points is indicated at 130 in FIG. 19. The overlap 130 is small, with the result that it is not possible to mount a seal between the filter column 16 and the top manifold.

In particular, there is insufficient material in the overlapping portions of the filter column 16 and the top manifold 18 mounting surfaces 128 and 120 to enable mounting of a seal. This prevents sealing of the filter column 16 and the top manifold 18 directly to one-another in the absence of the interface seal assembly 22, and so operation of the fluid filtration system without the tubular filter element 14 carrying the interface seal assembly. The filter column 16 is tubular, having a wall thickness $T_1$ (FIG. 16), and a ratio of the overlap 130 at the above points relative to the wall thickness $T_1$ is in the range of about 1:3 to about 1:5, particularly about 1:3 to about 1:4. Referring to FIG. 19, a wall of the adjacent filter columns 16 and 16a is shared, and of a thickness $T_2$, which is typically twice the thickness $T_1$.

The circular seal 38 describes a maximum outer diameter $D_2$ (FIG. 8) and a minimum inner diameter $D_3$. The non-circular seal 40 describes a maximum outer dimension $D_1$ (FIG. 6), which is less than the inner diameter $D_3$ of the circular seal 38. In the illustrated embodiment, the outer dimension $D_1$ is a diameter of the lobes 108/110. The intermediate portions 112 and 114 of the non-circular seal 40 are disposed radially inwardly of the circular seal 38, relative to the interface body 22. The intermediate portions 112 and 114 describe a minimum outer dimension $W_1$ of the non-circular seal 40, which is less than the minimum inner diameter $D_3$ of the circular seal 38. These features, in combination, help to provide the small overlap 130 between the top manifold 18 and the filter column 16, and the spaces 118 which accommodate the bypass passages 122 and 124.

The interface seal assembly 22 comprises a mount 132 extending from the interface body 22, for mounting the assembly to the filter column 16 and the top manifold. In the illustrated embodiment, the interface seal assembly 22 comprises four mounts 132, which are spaced apart around a perimeter of the interface body 22. It will be appreciated that any suitable number of mounts 132 may be provided, typically at least three. The mounts 132 each comprise an aperture 134 which is shaped to receive a fixing such as a bolt 136, for securing the interface seal assembly 22 to the filter column 16 and the top manifold 18. Each fixing 136 passes through an aperture 138 in the top manifold 18, through one of the mount apertures 134 and into a blind bore (not shown) in the filter column 16, to clamp the mount 132 between the filter column and the top manifold. This secures the interface seal assembly 22 between the filter column 16 and the top manifold 18, and so securely locates the filter element 14 in the column.

The interface body 22 also comprises a mounting structure 140, for mounting the interface body 22 to the tubular filter element 14. The mounting structure 140 defines a groove or channel 142 which receives the filter element housing 42. The mounting structure 140 protrudes from the first mounting surface 30 of the interface body 22 and takes the form of an annular lip or ring extending around the interface body. The channel 142 is shaped to receive a wall 144 of the filter element housing 42, suitably a part of the wall defining an edge surface at the end 24. The channel 142 is tapered, to provide a good engagement with the wall 144, reducing in width in a direction from an outer opening 146 towards a base 148 of the channel (FIG. 19).

The interface body 22 is secured to the filter element using a conventional 'potting' procedure, which is well known in filter technology. This involves supplying a time-curing adhesive (e.g., an epoxy-based adhesive) into the channel 142 and fitting the wall 144 of the filter element housing 42 into the channel. When the resin cures it provides a strong bond which also serves to seal the end of the housing 42 relative to the interface body 22. An engagement between the interface body 22 and the filter element housing 42 is enhanced by the provision of a number of castellations or 'potting pips' 152 (typically eight) on the base 148 of the channel 142, spaced apart around a circumference of the channel, as shown in FIGS. 8 and 12. The castellations 152 extend part way across a radial width of the channel 142, and part way towards the opening 146. Resin supplied into the channel flows around the castellations 152, which provides the enhanced engagement.

The interface seal assembly 12 comprises a handle 150 which extends from the interface body 22, and which facilitates handling of the tubular filter element 14 for location within the filter column 16, and removal when required for replacement/maintenance. The handle 150 projects from the interface body 22 in a direction away from the second mounting surface 32 and the filter element 14.

The aperture 26 defined by the interface body 22 is generally centrally located, relative to the 100 axis of the interface body. The aperture 26 typically has a non-circular shape, and a shape or profile of the aperture may be generally similar to the shape/profile of the non-circular seal 49 (for example generally kidney-bean shaped).

Various modifications may be made to the foregoing without departing from the spirit or scope of the present invention.

For example, the interface seal assembly may not be bonded to the tubular filter element, and/or may not be mounted on the tubular filter element. These parts could be provided separately, and the interface seal assembly only positioned on the tubular filter element when the interface body is positioned between the first and second components. Equally, the tubular filter element may not be in direct contact with the interface seal assembly and may simply sit in the filter column.

The interface seal assembly (in particular the interface body) may be secured to the tubular filter element by a technique other than potting, and which may not involve an adhesive. Such may include a mechanical connection such as crimping, bolting or riveting.

It may be possible to dispense with a bypass passage or passages by appropriate shaping of the first and second components, in particular their mounting surfaces. Bypass may be achieved due to the natural geometry of one of the two components, specifically their mounting surfaces.

The invention claimed is:

1. An interface seal assembly for sealing a tubular filter element relative to a first component of a fluid filtration system and a second component of the fluid filtration system, the interface seal assembly comprising:
    an interface body which is adapted to be positioned between the first component and the second component of the fluid filtration system, the interface body comprising:
        an aperture extending through the interface body, for communicating with an internal cavity of the tubular filter element;
        a first mounting surface comprising a first seal groove; and
        a second mounting surface opposite the first mounting surface, the second mounting surface comprising a second seal groove;
        in which one of the first and second seal grooves has a circular shape in plan view, and the other one of the first and second seal grooves has a non-circular shape in plan view;
    a first seal located in the first seal groove, for sealing the interface body relative to one of the first and second components; and
    a second seal located in the second seal groove, for sealing the interface body relative to the other one of the first and second components.

2. The interface seal assembly as claimed in claim 1, in which the interface body is a one-piece body defining the aperture, first and second mounting surfaces and first and second seal grooves.

3. The interface seal assembly as claimed in claim 1, in which the interface body is annular, the first mounting surface is disposed in a first plane, the second mounting surface is disposed in a second plane, and the first and second planes are parallel and perpendicular to an axis of the interface body.

4. The interface seal assembly as claimed in claim 1, in which the first and second seals are generally planar.

5. The interface seal assembly as claimed in claim 4, in which the first and second seals each define central axes which extend around bodies of the seals, the central axes disposed in single planes.

6. The interface seal assembly as claimed in claim 1, in which the first and second seals are axial face seals, adapted to provide an axial seal against surfaces of the respective components.

7. The interface seal assembly as claimed in claim 1, in which the non-circular seal has a generally kidney-bean shape in plan view.

8. The interface seal assembly as claimed in claim 1, in which the non-circular seal comprises a first lobe, a second lobe, and intermediate portions which connect the first and second lobes.

9. The interface seal assembly as claimed in claim 8, in which the lobes are curved, having substantially constant radii of curvature.

10. The interface seal assembly as claimed in claim 9, in which the intermediate portions each extend inwardly so that they are displaced from a circle which intersects the curved lobes.

11. The interface seal assembly as claimed in claim 1, in which the non-circular seal comprises a main generally circular portion describing a diameter of the seal, and a waist portion which is narrowed relative to the main portion.

12. The interface seal assembly as claimed in claim 11, in which a width of the waist portion is less than the diameter.

13. The interface seal assembly as claimed in claim 12, in which the waist portion is defined by opposed narrowed sections which extend inwardly towards a centre of the seal.

14. The interface seal assembly as claimed in claim 1, in which the non-circular seal comprises a generally circular part which extends along a generally circular path, and at least one further part which is deflected from the circular path, to provide the seal with its non-circular shape.

15. The interface seal assembly as claimed in claim 14, in which the at least one further part is disposed at least partly within the circular path described by the circular part of the seal, a space being defined between an outer extent of said further part and the circular path.

16. The interface seal assembly as claimed in claim 14, in which said further part curves inwardly from the circular path towards a centre of the seal.

17. The interface seal assembly as claimed in claim 14, in which the generally circular part comprises a first curved portion and a second curved portion, each of which extend along the circular path, and in which the seal comprises first and second further parts which connect the first curved portion to the second curved portion.

18. The interface seal assembly as claimed in claim 17, in which the curved portions and the further portions are provided alternately, in a direction around a perimeter of the seal.

19. The interface seal assembly as claimed in claim 1, in which the interface seal assembly comprises at least one mount, for mounting the assembly to the first and second components.

20. The interface seal assembly as claimed in claim 1, in which the interface body comprises a mounting structure for mounting the body to the tubular filter element, the mounting structure comprising a channel which is adapted to receive a housing of the tubular filter element, the channel provided on one of the first and second mounting surfaces.

21. The interface seal assembly as claimed in claim 20, in which the mounting structure comprises an annular lip which defines the channel.

22. The interface seal assembly as claimed in claim 1, comprising a handle which extends from the interface body.

23. The interface seal assembly as claimed in claim 1, in which the circular seal describes a maximum outer diameter and a minimum inner diameter, and the non-circular seal describes a maximum outer dimension which is less than said outer diameter.

24. The interface seal assembly as claimed in claim 23, in which the maximum outer dimension is less than said inner diameter.

25. The interface seal assembly as claimed in claim 23, in which at least part of the non-circular seal is disposed radially inwardly of the circular seal, relative to the interface body, and said part of the non-circular seal describes a minimum outer dimension of the non-circular seal which is less than said minimum inner diameter of the circular seal.

26. The interface seal assembly as claimed in claim 1, in which the interface body is adapted to be mounted on an end of the tubular filter element.

27. The interface seal assembly as claimed in claim 1, wherein the interface seal assembly forms an end cap of the tubular filter element.

28. A tubular filter element assembly comprising a tubular filter element and an interface seal assembly for sealing the tubular filter element relative to a first component of a fluid filtration system and a second component of the fluid filtration system, the interface seal assembly comprising:
   an interface body adapted to be positioned between the first component and the second component of the fluid filtration system and comprising:
      an aperture extending through the interface body, for communicating with an internal cavity of the tubular filter element;
      a first mounting surface comprising a first seal groove; and
      a second mounting surface opposite the first mounting surface, the second mounting surface comprising a second seal groove;
      in which one of the first and second seal grooves has a circular shape in plan view, and the other one of the first and second seal grooves has a non-circular shape in plan view;
   a first seal located in the first seal groove, for sealing the interface body relative to one of the first and second components; and
   a second seal located in the second seal groove, for sealing the interface body relative to the other one of the first and second components.

29. The tubular filter element as claimed in claim 28, in which the interface body is a one-piece body defining the aperture, first and second mounting surfaces and first and second seal grooves.

30. A fluid filtration system comprising:
   a first component;
   a second component; and
   a tubular filter element assembly comprising a tubular filter element and an interface seal assembly for sealing the tubular filter element relative to the first component and the second component, the interface seal assembly comprising:
      an interface body adapted to be positioned between the first component and the second component of the fluid filtration system and comprising:
         an aperture extending through the interface body, for communicating with an internal cavity of the tubular filter element;
         a first mounting surface comprising a first seal groove; and
         a second mounting surface opposite the first mounting surface, the second mounting surface comprising a second seal groove;
         in which one of the first and second seal grooves has a circular shape in plan view, and the other one of the first and second seal grooves has a non-circular shape in plan view;
      a first seal located in the first seal groove, for sealing the interface body relative to one of the first and second components; and
      a second seal located in the second seal groove, for sealing the interface body relative to the other one of the first and second components.

31. The fluid filtration system as claimed in claim 30, in which the interface body is a one-piece body defining the aperture, first and second mounting surfaces and first and second seal grooves.

32. The fluid filtration system as claimed in claim 30, in which one of the first and second components is a tubular housing comprising an internal chamber which receives the tubular filter element, and the other one of the first and second components is a manifold of a manifold assembly.

33. The fluid filtration system as claimed in claim 30, in which the interface body is visible from an exterior of the fluid filtration system following positioning of the interface body between the first and second components.

34. The fluid filtration system as claimed in claim 30, in which the first component comprises a mounting surface which faces towards the interface body, when the interface body is positioned between the components, and in which the first seal seals the interface body relative to the mounting surface of the first component.

35. The fluid filtration system as claimed in claim 34, in which the second component comprises a mounting surface which faces towards the interface body, when the interface body is positioned between the components, and in which the second seal seals the interface body relative to the mounting surface of the second component.

36. The fluid filtration system as claimed in claim 34, in which one of the first and second components comprises at least one bypass passage formed in the mounting surface of the component which faces towards the interface body.

37. The fluid filtration system as claimed in claim 36, in which the at least one bypass passage is disposed, in use, outside of a perimeter of the non-circular seal.

38. The fluid filtration system as claimed in claim 37, in which:

the non-circular seal comprises a generally circular part extending along a generally circular path, and at least one further part disposed at least partly within the circular path; and the at least one bypass passage is disposed within the circular path adjacent the further part and outside of the perimeter of the seal.

39. The fluid filtration system as claimed in claim 38, in which a space is defined between an outer extent of said further part and the circular path, and the bypass passage is disposed in the space.

40. The fluid filtration system as claimed in claim 36, in which at least one bypass passage is disposed within a perimeter defined by the non-circular seal.

41. The fluid filtration system as claimed in claim 36, in which the at least one bypass passage is a blind bore.

42. The fluid filtration system as claimed in claim 35, in which:

the first component mounting surface extends around a perimeter of the component and faces towards the second component mounting surface, when the interface body is positioned between the components; and the second component mounting surface is arranged so that it only partially overlaps the first component mounting surface, at least at one point around the perimeter of the first component.

43. The fluid filtration system as claimed in claim 42, in which the first component is tubular and has a wall thickness, and in which a ratio of the overlap at said point relative to the wall thickness is in the range of 1:3 to 1:4.

44. A method of positioning a tubular filter element in a fluid filtration system and sealing the tubular filter element relative to first and second components of the fluid filtration system, the method comprising the steps of:

providing an interface seal assembly comprising:

an interface body which is adapted to be positioned between the first component and the second component of the fluid filtration system, the interface body comprising:

i. an aperture extending through the interface body, for communicating with an internal cavity of the tubular filter element;

ii. a first mounting surface comprising a first seal groove; and iii. a second mounting surface opposite the first mounting surface, the second mounting surface comprising a second seal groove;

in which one of the first and second seal grooves has a circular shape in plan view, and the other one of the first and second seal grooves has a non-circular shape in plan view;

iv. a first seal located in the first seal groove, for sealing the interface body relative to one of the first and second components; and v. a second seal located in the second seal groove, for sealing the interface body relative to the other one of the first and second components;

positioning the interface body of the interface seal assembly between the first component and the second component of the fluid filtration system with the aperture of the interface body in communication with the internal cavity of the tubular filter element; and securing the first component relative to the second component so that the interface body is clamped between the components, the first component being sealed relative to the interface body via one of the first and second seals, and the second component being sealed relative to the interface body via the other one of the first and second seals.

* * * * *